(12) United States Patent
Leung et al.

(10) Patent No.: US 6,870,894 B2
(45) Date of Patent: Mar. 22, 2005

(54) COMPACT NEUTRON GENERATOR

(75) Inventors: Ka-Ngo Leung, Hercules, CA (US); Tak Pui Lou, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/410,623

(22) Filed: Apr. 8, 2003

(65) Prior Publication Data

US 2004/0022341 A1 Feb. 5, 2004

Related U.S. Application Data

(60) Provisional application No. 60/370,948, filed on Apr. 8, 2002.

(51) Int. Cl.[7] ................................................ G21B 1/00
(52) U.S. Cl. ........................ 376/114; 376/190; 376/108; 376/144; 250/423; 250/269
(58) Field of Search .................................... ; G21B 1/00

(56) References Cited

U.S. PATENT DOCUMENTS

| | | | | |
|---|---|---|---|---|
| 3,417,245 A | * | 12/1968 | Albrecht ........................ | 376/109 |
| 3,530,497 A | * | 9/1970 | Hirsch et al. ................. | 376/107 |
| 3,609,369 A | * | 9/1971 | Croitoru ........................ | 376/108 |
| 4,047,068 A | * | 9/1977 | Ress et al. ................ | 313/359.1 |
| 4,851,687 A | * | 7/1989 | Ettinger et al. ......... | 250/390.04 |
| 4,935,623 A | * | 6/1990 | Knauer .......................... | 250/251 |
| 5,256,854 A | * | 10/1993 | Bromberg et al. ...... | 219/121.52 |
| 2003/0152186 A1 | * | 8/2003 | Jurczyk et al. .............. | 376/109 |

* cited by examiner

*Primary Examiner*—Michael J. Carone
*Assistant Examiner*—R Palabrica
(74) *Attorney, Agent, or Firm*—Joseph R. Milner

(57) ABSTRACT

A compact neutron generator has at its outer circumference a toroidal shaped plasma chamber in which a tritium (or other) plasma is generated. A RF antenna is wrapped around the plasma chamber. A plurality of tritium ion beamlets are extracted through spaced extraction apertures of a plasma electrode on the inner surface of the toroidal plasma chamber and directed inwardly toward the center of neutron generator. The beamlets pass through spaced acceleration and focusing electrodes to a neutron generating target at the center of neutron generator. The target is typically made of titanium tubing. Water is flowed through the tubing for cooling. The beam can be pulsed rapidly to achieve ultrashort neutron bursts. The target may be moved rapidly up and down so that the average power deposited on the surface of the target may be kept at a reasonable level. The neutron generator can produce fast neutrons from a T-T reaction which can be used for luggage and cargo interrogation applications. A luggage or cargo inspection system has a pulsed T-T neutron generator or source at the center, surrounded by associated gamma detectors and other components for identifying explosives or other contraband.

19 Claims, 13 Drawing Sheets

Neutron energy spectra from fusion reactions

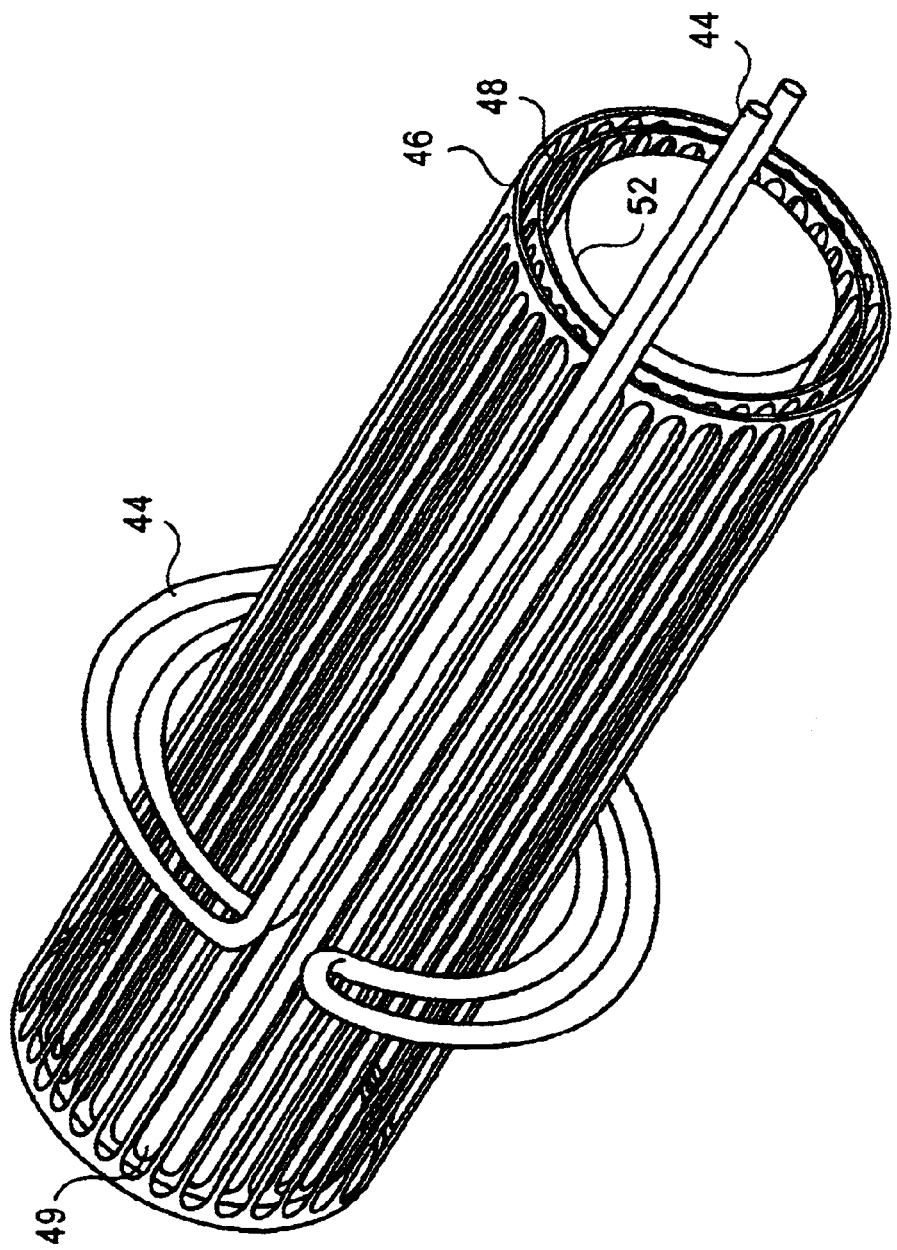

SIDE-VIEW OF NEUTRON GENERATOR

TOP VIEW OF NEUTRON GENERATOR

COMPACT NEUTRON GENERATOR

RELATED APPLICATIONS

This application claims priority of Provisional Application Ser. No. 60/370,948 filed Apr. 8, 2002, which is herein incorporated by reference.

GOVERNMENT RIGHTS

The United States Government has rights in this invention pursuant to Contract No. DE-AC03-76SF00098 between the United States Department of Energy and the University of California.

BACKGROUND OF THE INVENTION

Conventional neutron tubes employ a Penning ion source and a single gap extractor. The target is a deuterium or tritium chemical embedded in a molybdenum or tungsten substrate. Neutron yield is limited by the ion source performance and beam size. The production of neutrons is limited by the beam current and power deposition on the target. In the conventional neutron tube, the extraction aperture and the target are limited to small areas, and so is the neutron output flux.

Commercial neutron tubes have used the impact of deuterium on tritium (D-T) for neutron production. The D-T reaction produces 14.1 MeV neutrons. The deuterium-on-deuterium (D-D) reaction, with a cross section for production a hundred times lower, has not been able to provide sufficient neutron flux. The D-D reaction produces 2.45 MeV neutrons.

Neutronics can identify possible explosives and nuclear materials by their composition, not just by their shape or density the way x-ray machines do. Since the September 11 terrorist attacks, detection of explosives and fissionable materials has become an urgent national need. Detecting such materials hidden in baggage or cargo is challenging under real-world conditions.

Thermal neutron analysis (TNA) has been tried for inspection of checked baggage and cargo at airports. Low-energy neutrons cause nitrogen in explosives to emit gamma rays and cause fissile materials to give off neutrons of their own. The first-generation TNA screeners were too large, complex, and expensive; furthermore, TNA requires moderators to slow fast neutrons from a source to thermal neutrons. FAA-approved screening devices presently on the market use x-rays to look at shapes and densities, rather than using neutronics to detect actual composition.

Fast neutron interrogation of luggage and cargo for contraband such as explosives and narcotics has also been proposed. In particular, neutron absorption spectroscopy is a technique in which materials are identified by absorption of neutrons from a neutron source and emission of gamma rays which are detected with gamma ray detectors. To identify different materials, a broad neutron energy spectrum, typically 1 MeV to 9 MeV is required, since each element absorbs at a different neutron energy.

Thus a neutron source with a broad energy spectrum over the 1 MeV–9 MeV range is desired for a baggage or cargo interrogation system based on neutron absorption spectroscopy. A D-D source is unsuitable because it is too low energy. While a D-T source may be used, it produces too high energy neutrons which must be slowed by moderators to the desired energy range, resulting is larger sized systems with large loss of neutron flux and loss of beam directionality.

An interrogation system based on the D-Be reaction has been proposed. $D^+$ ions from an ion source injector are accelerated in a cyclotron to 9 MeV and then directed onto a Be target to produce neutrons. The system is low current, large and complex.

Besides the obvious considerations of cost-effectiveness and acceptable footprint, systems for inspecting baggage and cargo must offer trustworthiness (reliability with freedom from both false positives and false negatives), plus high throughput so that spot checks can be replaced by comprehensive inspection without bottlenecking an already heavily burdened process. Fast interrogation of about 2 sec/piece of luggage is preferred. Systems are also needed for relatively nonintrusive inspection of larger objects, e.g. an intermodal cargo container, or a vehicle.

Plasma fusion researchers have studied the plasmas of hydrogen isotopes. In addition to the D-D and D-T reactions described above, the T-T reaction also produces neutrons, by the reaction $T+T \rightarrow {}^4He+2n$. The reaction produces two neutrons per reaction compared to one neutron for each D-D or D-T reaction, and the neutrons have a continuum energy spectrum extending up to 9.4 MeV. However, this reaction has not been used in conventional neutron sources.

Therefore, in accordance with the invention, a compact neutron generator based on the T-T reaction, and a luggage and cargo interrogation system based on a T-T neutron generator, would be highly advantageous.

SUMMARY OF THE INVENTION

The invention is a neutron generator that produces fast neutrons from a T-T reaction which can be used for luggage and cargo interrogation applications. The neutron generator may have many different geometries, but generally includes a RF-driven tritium plasma source and a nearby neutron generating target to which tritium ions are accelerated. The target is or becomes loaded with tritium to produce the T-T reactions.

The neutron generator or source is typically compact in size, operates at a high current of up to about 1 A with a relatively low voltage accelerator of about 100 kV, and produces a relatively high neutron flux, typically over $10^{11}$ n/s, having a continuous energy spectrum of 1 MeV to 9 MeV. The source is typically pulsed.

The T-T neutron generator produces a broad flat neutron energy spectrum up to about 9 MeV. This energy spectrum is ideal for fast neutron absorption spectroscopy. Therefore, the invention also includes a luggage or cargo inspection system based on a pulsed T-T neutron generator or source and associated gamma detectors and other known components for identifying explosives or other contraband.

A particular compact neutron generator of the invention has extending inward from its outer circumference, a toroidal shaped plasma chamber in which a tritium (or other) plasma is generated. A RF antenna is wrapped around the plasma chamber to generate tritium ions from tritium gas by RF induction discharge. The antenna is typically located outside the chamber.

A plasma electrode with a plurality of spaced extraction apertures forms the inner surface of the toroidal plasma chamber so that a plurality of tritium ion beamlets are extracted and directed inwardly toward the center of neutron generator. The beamlets pass through aligned apertures in a plurality of spaced concentric or coaxial acceleration and focusing electrodes to a neutron generating target at the center of neutron generator.

The target is typically made of titanium tubing with an outer diameter of less than 2 mm. Water is flowed through the tubing for cooling. The beamlets will irradiate the target substantially uniformly and the target will become loaded with tritium which will react with incident tritium ions. Neutrons will be generated substantially isotropically by the T-T fusion reaction.

The neutron generator is nearly a point source. The beam can be pulsed rapidly to achieve ultrashort neutron bursts. To achieve a desired neutron flux, the total beam power deposited on the target may be too high to cool merely with running water. The target may be moved rapidly up and down so that the average power deposited on the surface of the target may be kept at a reasonable level.

For other applications, the neutron generator may be operated with a deuterium or deuterium-tritium plasma instead of a tritium plasma. In that case, the neutron output will have the energy associated with the D-D or D-T reaction instead of the T-T reaction.

DETAILED DESCRIPTION OF THE INVENTION

Figure 1:
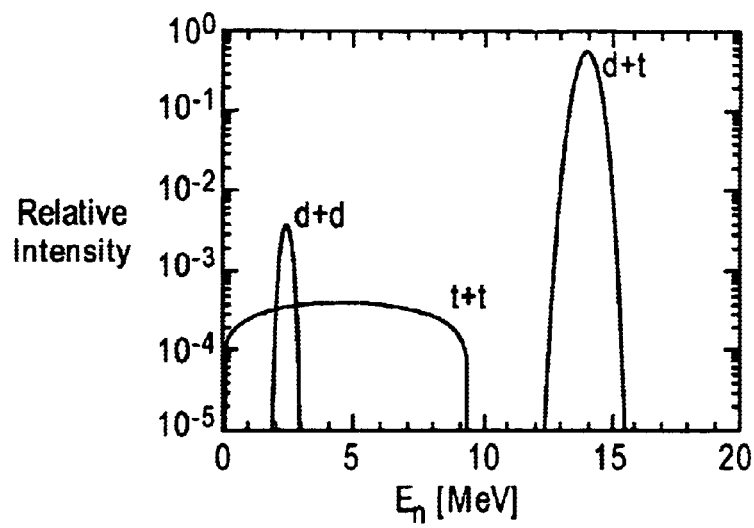
FIG. 1 is a graph of the neutron energy spectra produced by hydrogen isotope fusion reactions.

The neutron energy spectra from fusion reactions of the deuterium (D) and tritium (T) hydrogen isotopes are shown in FIG. 1. Neutrons from the D-D and D-T reactions are essentially monoenergetic, with small energy spreads about 2.45 MeV and 14.1 MeV respectively. However, the T-T neutrons, produced by the reaction T+T→$^4$He+2n, have a continuum energy spectrum extending up to 9.4 MeV, and twice as many neutrons are produced per reaction as per each D-D or D-T reaction.

Therefore, one aspect of the present invention is the use of the T-T reaction in a neutron source, particularly in a neutron source based on a plasma ion source which produces tritium ions. The principles of plasma ion sources are well known in the art. Conventional multicusp plasma ion sources are illustrated by U.S. Pat. Nos. 4,793,961; 4,447,732; 5,198,677; 6,094,012, which are herein incorporated by reference.

In general a neutron generator has a plasma ion source (of tritium ions) and a neutron generating target which is bombarded by the tritium ions. The ion source includes an RF antenna (induction coil) in or surrounding a plasma chamber for producing an ion plasma from a gas, tritium, which is introduced into chamber.

The ion source also includes an extraction electrode at its outlet to electrostatically control the passage of ions from the plasma out of the plasma chamber. Spaced apart from the ion source is a neutron generating target. Ions from the plasma source pass through the electrode and impinge on the target, producing neutrons as the result of ion induced reactions. The target is loaded with T atoms by the beam.

Certain compact neutron generators based on plasma ion sources and having cylindrical or spherical geometries have been developed at Lawrence Berkeley National Laboratory and are well adapted for use in the present invention. These neutron sources are described in provisional application Ser. Nos. 60/276,669 filed Mar. 16, 2001 and 60/316,792 filed Aug. 31, 2001 (relating to cylindrical geometries), and 60/276,670 filed Mar. 16, 2001 (relating to spherical geometry), and corresponding regular application Ser. Nos. 10/100,962 and 10/100,955 filed Mar. 18, 2002, all of which are herein incorporated by reference. These sources which were designed for D-T or D-D reactions are modified to use just tritium, i.e. the gas in the plasma generation chamber is just tritium gas so that only tritium ions are extracted. The tritium ions are incident on a neutron generating target which is or becomes loaded with tritium and produces neutrons by the T-T reaction. These neutron generators are described further below.

Figure 2:
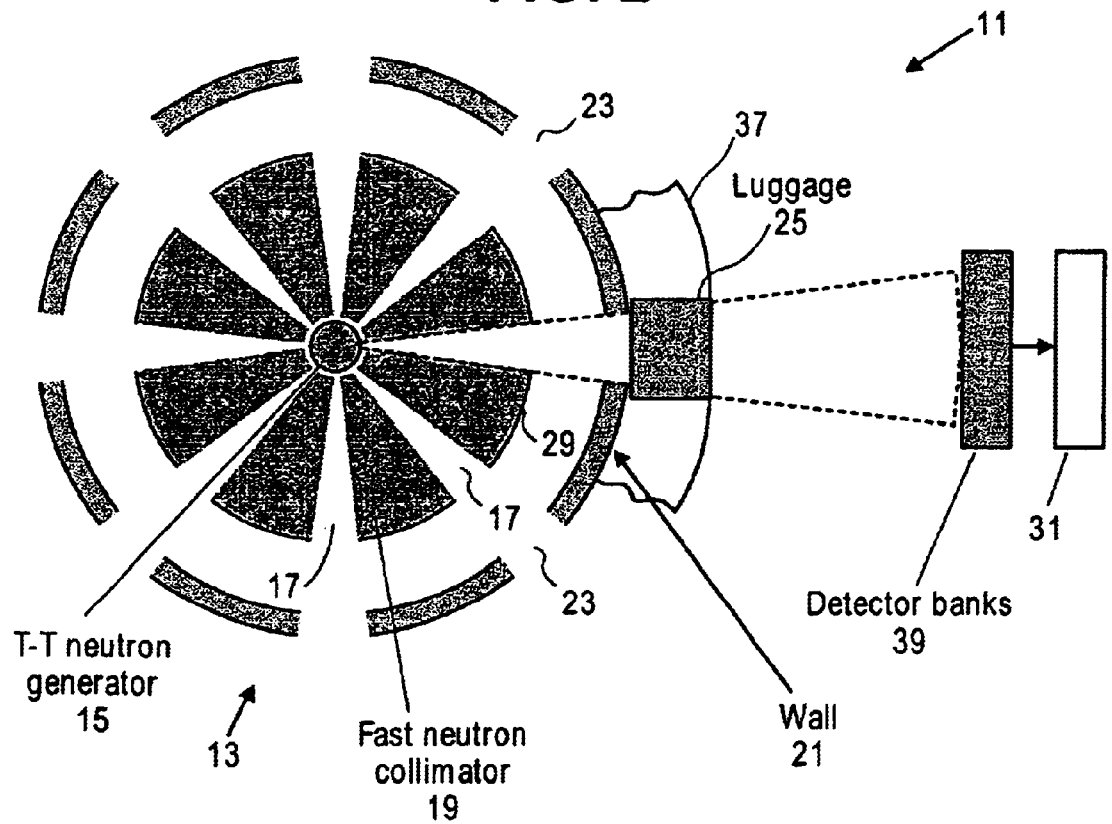
FIG. 2 is a schematic diagram of a T-T neutron generator based luggage or cargo interrogation system of the invention.

FIG. 2 illustrates a T-T neutron luggage interrogation system 11 of the invention. System 11 includes a neutron source 13 which has a central T-T neutron generator 15, preferably of cylindrical geometry, which produces fast neutrons with the desired 1–9 MeV energy spectrum. The neutrons from generator 15 are divided into channels 17 by fast neutron collimator elements 29 which are typically made of polyethylene. Neutron generator 15 and collimator 29 are surrounded by wall 21 with a plurality of apertures 23 which are aligned with channels 17 so that neutrons produced by generator 15 are output through apertures 23. Luggage 25 sitting on a moving conveyor 37 is temporarily positioned adjacent an aperture 23 for interrogation. With the cylindrical geometry and multiple apertures 23, several pieces of luggage 25 can be inspected at the same time. Detector banks 39 are positioned to detect gamma rays from luggage 25 produced by neutron bombardment. Processor 31 is connected to the outputs from detector banks 39 to analyze the data and identify materials in the luggage, using known techniques.

Figure 3A:
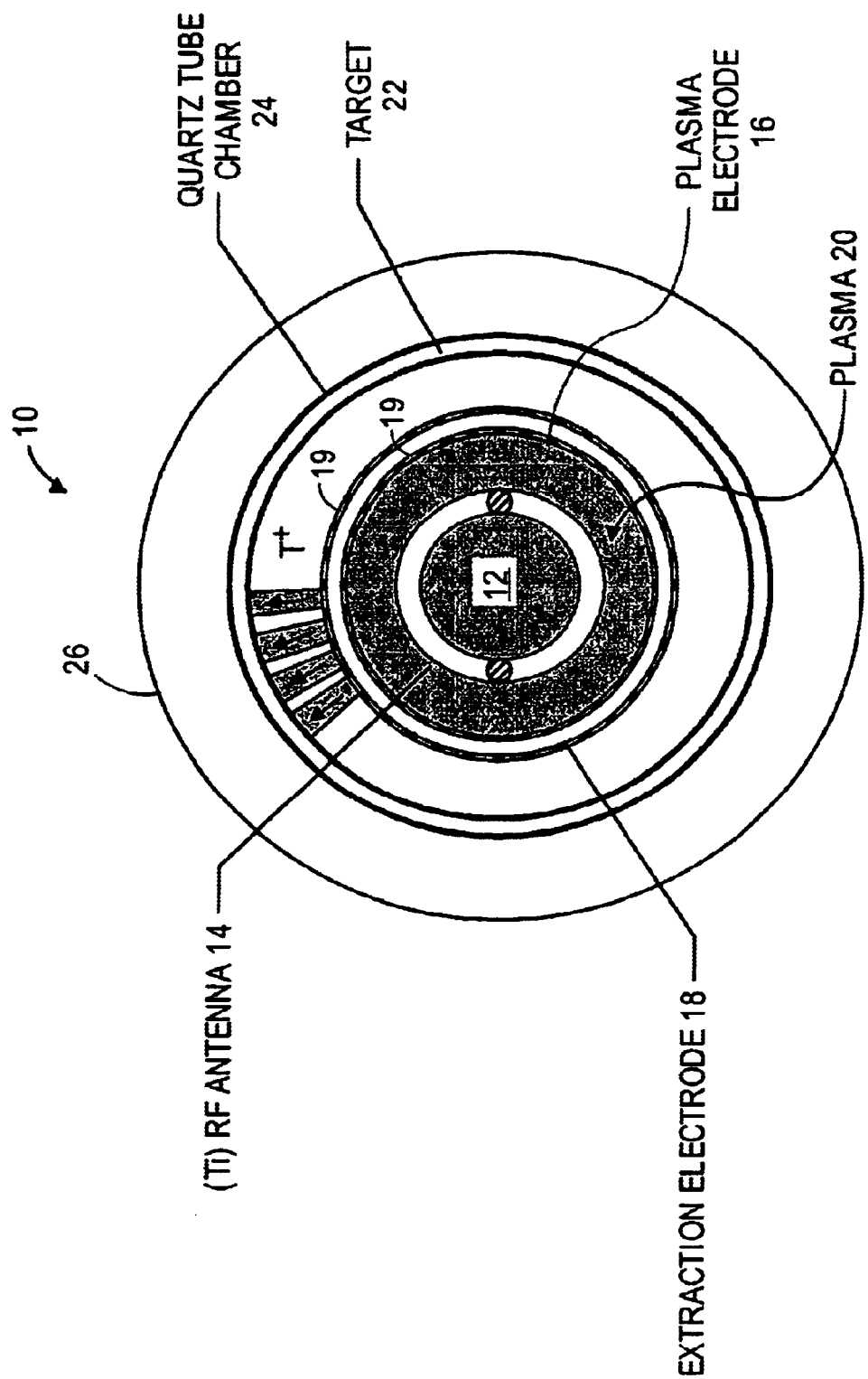
FIGS. 3A, B are radial cross sections of two alternate basic embodiments of a cylindrical neutron generator, with the coaxial target on the outside and inside, respectively.
Figure 3B:
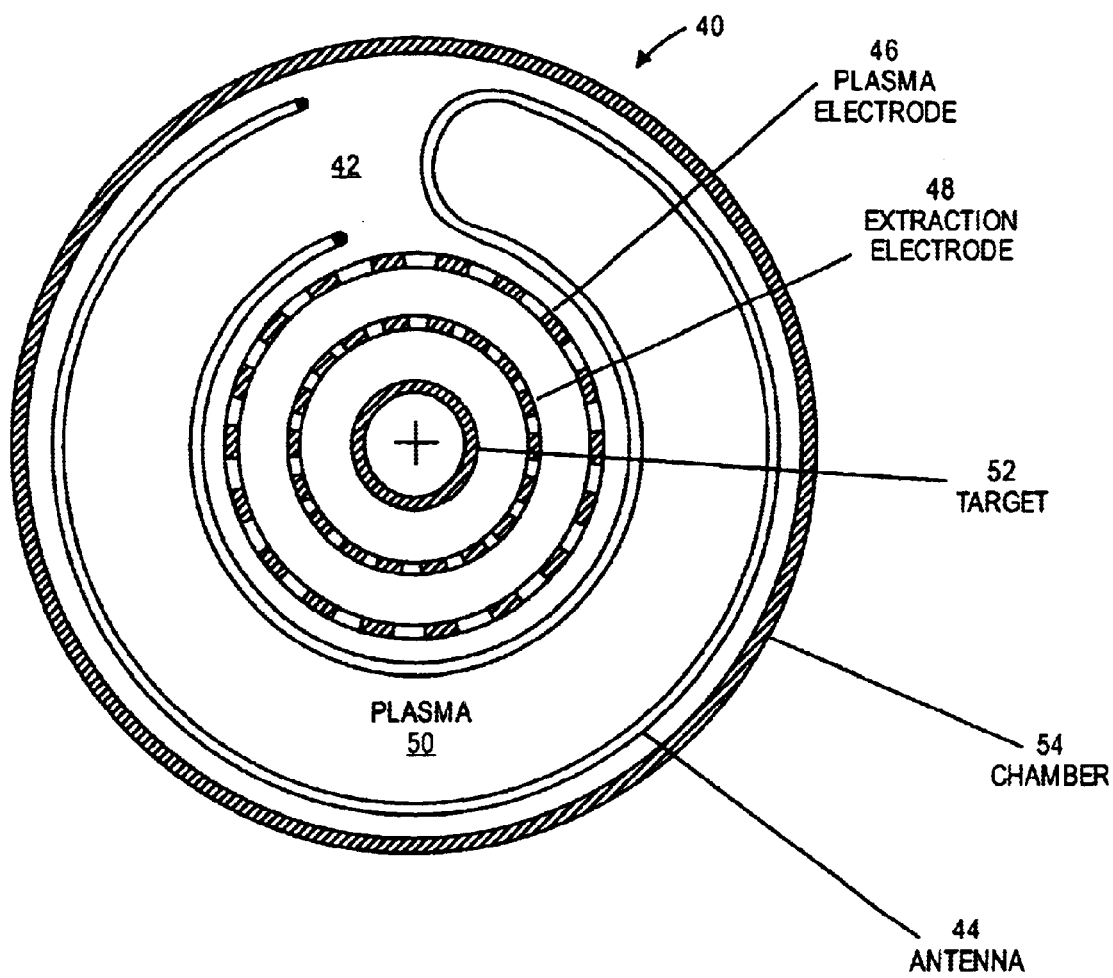
Figure 4A:
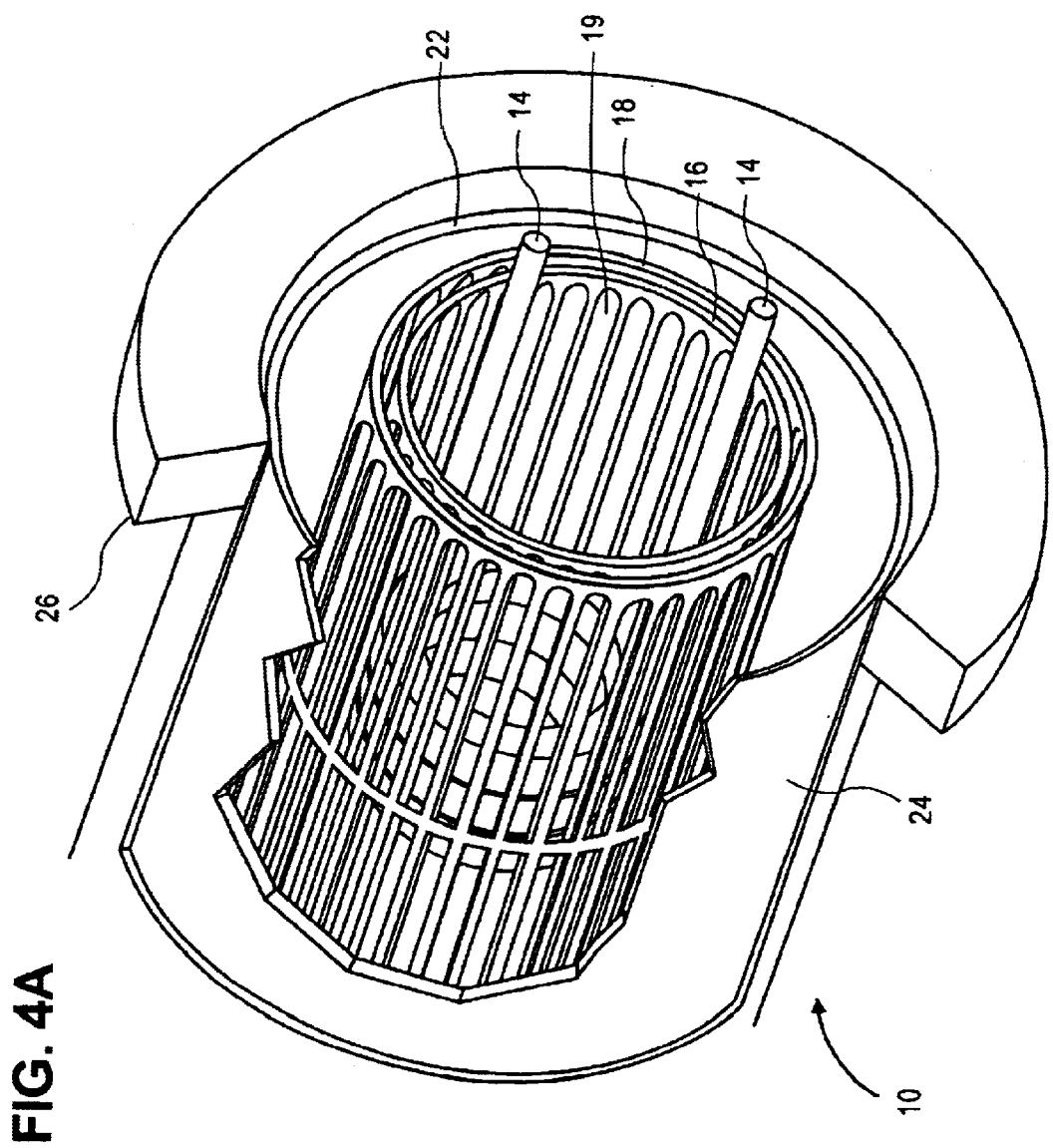
FIGS. 4A, B are perspective views, partly in section, of the two alternate basic embodiments of the cylindrical neutron generator.
Figure 5A:
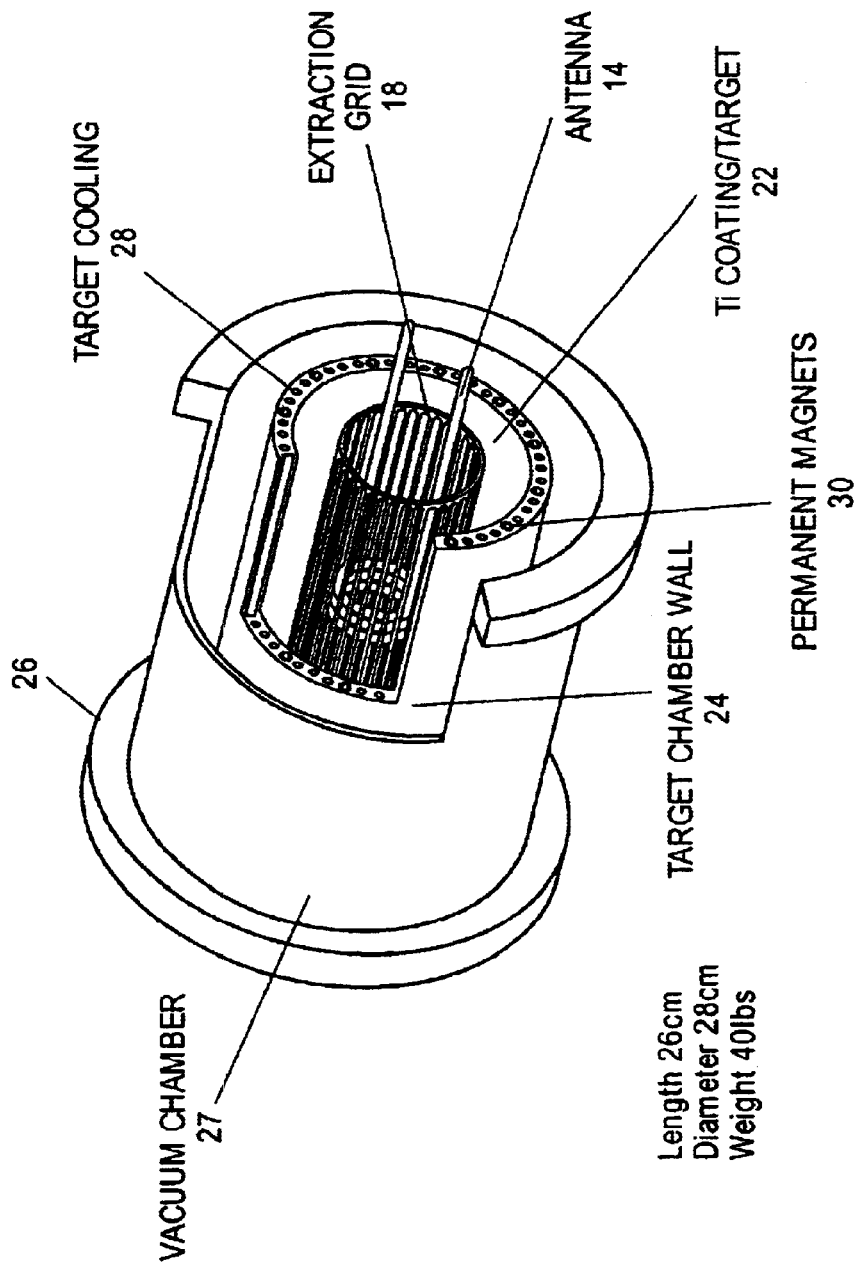
FIGS. 5A, B, C are further perspective views, partly in section, of the two alternate basic embodiments of the cylindrical neutron generator.

FIGS. 3A, 4A, 5A show the neutron source geometry of a first embodiment 10 of a cylindrical neutron generator, which has a cylindrical neutron generating target outside a cylindrical plasma ion source. Neutron generator 10 has a cylindrical plasma ion source 12 at its center. Ion source 12 includes an RF antenna (induction coil) 14 for producing an ion plasma 20 from a gas which is introduced into ion source 12. Antenna 14 is typically made of titanium tubing, which may be water cooled. For the present invention the plasma is a tritium plasma. Ion source 12 also includes a pair of spaced electrodes, plasma electrode 16 and extraction electrode 18, along its outer circumference. Electrodes 16, 18 electrostatically control the passage of ions from plasma 20 out of ion source 12. Electrodes 16, 18 contain many longitudinal slots 19 along their circumferences so that ions radiate out in a full 360° radial pattern.

Coaxially or concentrically surrounding ion source 12 and spaced therefrom is cylindrical target 22. Target 22 is the neutron generating element. Ions from plasma source 12 pass through slots 19 in electrodes 16, 18 and impinge on target 22, typically with energy of 120 keV to 150 keV, producing neutrons as the result of ion induced reactions. The target 22 is loaded with T atoms by the beam. Titanium is not required, but is preferred for target 22 since it improves the absorption of these atoms. Target 22 may be a titanium shell or a titanium coating on another chamber wall 24, e.g. a quartz tube. Flange 26 extends from the ends of chamber wall 24.

The extraction apertures in electrodes 16, 18 are in the form of slots 19 whose length can be extended to any desired value. The beam impinges on the target 22 in 360° and therefore the target area can be enhanced by at least 2 orders of magnitude over conventional neutron sources. The neutrons produced will also go out radially in 360°.

FIG. 4A shows further details of neutron generator embodiment 10 from FIG. 3A. Induction coil (RF antenna) 14 is positioned inside concentric cylindrical electrodes 16, 18. Ions passing through the slots 19 in electrodes 16, 18 strike target (surface) 22.

FIG. 5A shows some further details and minor variations of the design. The entire generator 10 is contained within a vacuum chamber 27 which is spaced apart from target chamber wall 24. Only a single extraction grid 18 is shown; plasma grid 16 is not needed since the ions can be extracted with a single grid. Chamber wall 24, on which target coating 22 is formed, is surrounded by target cooling coils 28. Permanent magnets 30 are arranged in a spaced apart relationship, running longitudinally along plasma ion generator 12, to from a magnetic cusp plasma ion source.

FIGS. 3B, 4B, 5B, 5C show the neutron source geometry of a second embodiment 40 of a cylindrical neutron generator, which is similar to neutron generator 10, except that the cylindrical ion source and neutron generating target are in a reversed position, i.e. the cylindrical neutron generating target is inside the cylindrical plasma ion source. Neutron generator 40 has a cylindrical plasma ion source 42 at its outside. Ion source 42 includes an RF antenna (induction coil) 44 for producing a T ion plasma 50. Ion source 42 also includes a pair of spaced electrodes, plasma electrode 46 and extraction electrode 48, along its inner circumference. Electrodes 46, 48 electrostatically control the passage of ions from plasma 50 out of ion source 42 into the interior of neutron generator 40. Electrodes 46, 48 contain many longitudinal slots 49 along their circumferences so that ions radiate in a full 360° radial pattern. Extraction electrode 48 is inside plasma electrode 46, the reverse of neutron generator 10, since the direction of plasma flow from the plasma ion source 42 is radially inward rather than radially outward, as in neutron generator 10.

Ion source 42 coaxially or concentrically surrounds and is spaced from an inner cylindrical target 52. Target 52 is the neutron generating element. Ions from plasma source 42 pass through slots 49 in electrodes 46, 48 and impinge on target 52, typically with energy of 120 keV to 150 keV, producing neutrons as the result of ion induced reactions. The target 52 is loaded with T atoms by the beam. Titanium is not required, but is preferred for target 52 since it improves the absorption of these atoms. Neutron generator 40 is enclosed in an external chamber 54.

The extraction apertures in electrodes 46, 48 are in the form of slots 49 whose length can be extended to any desired value. The beam impinges on the target 52 in 360° and therefore the target area can be enhanced. However, between neutron sources 10 and 40, for the same outside source diameter, the target in source 10 will be larger because of its larger diameter. The neutrons produced will also go out radially in 360°.

Figure 5B:
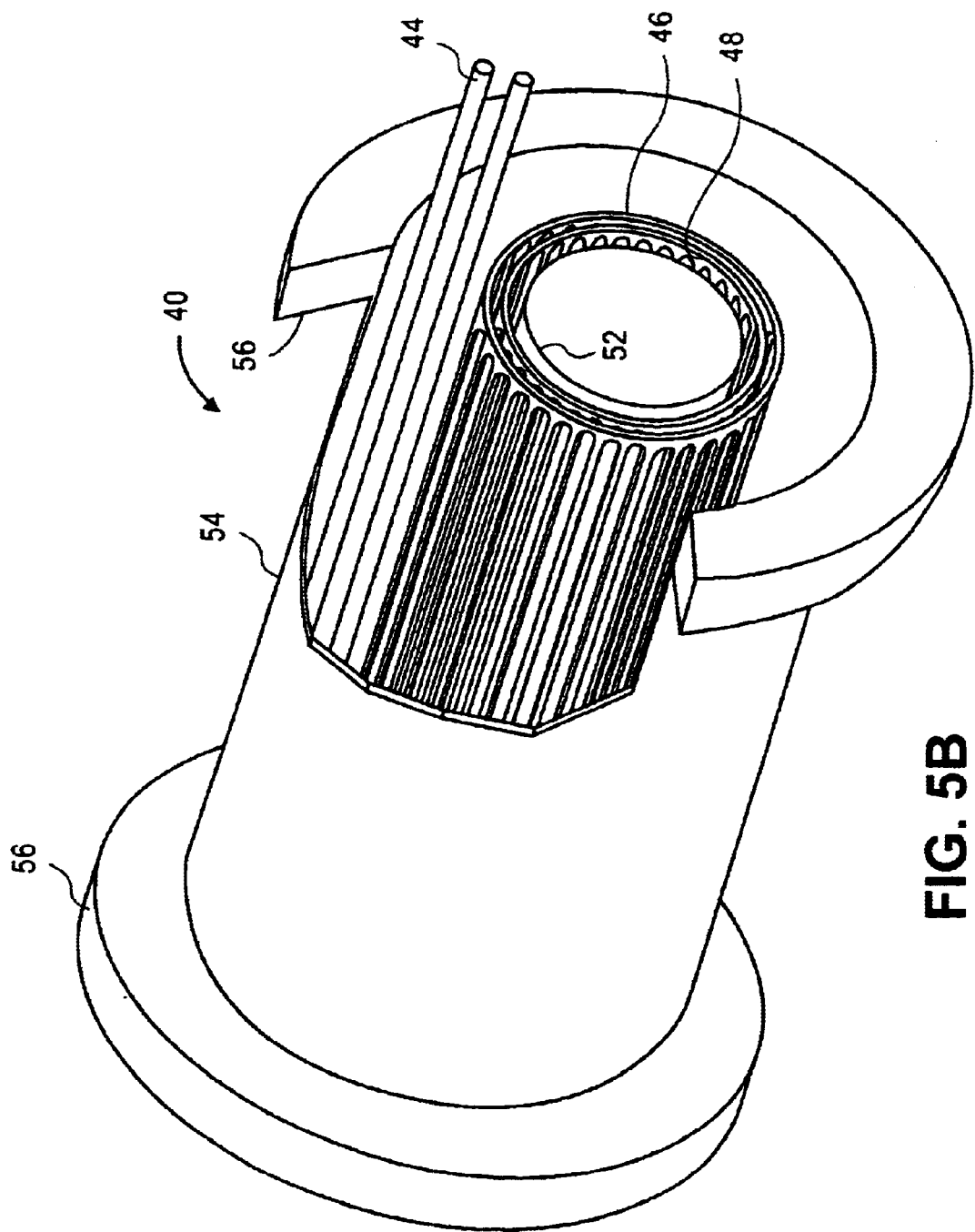
Figure 5C:
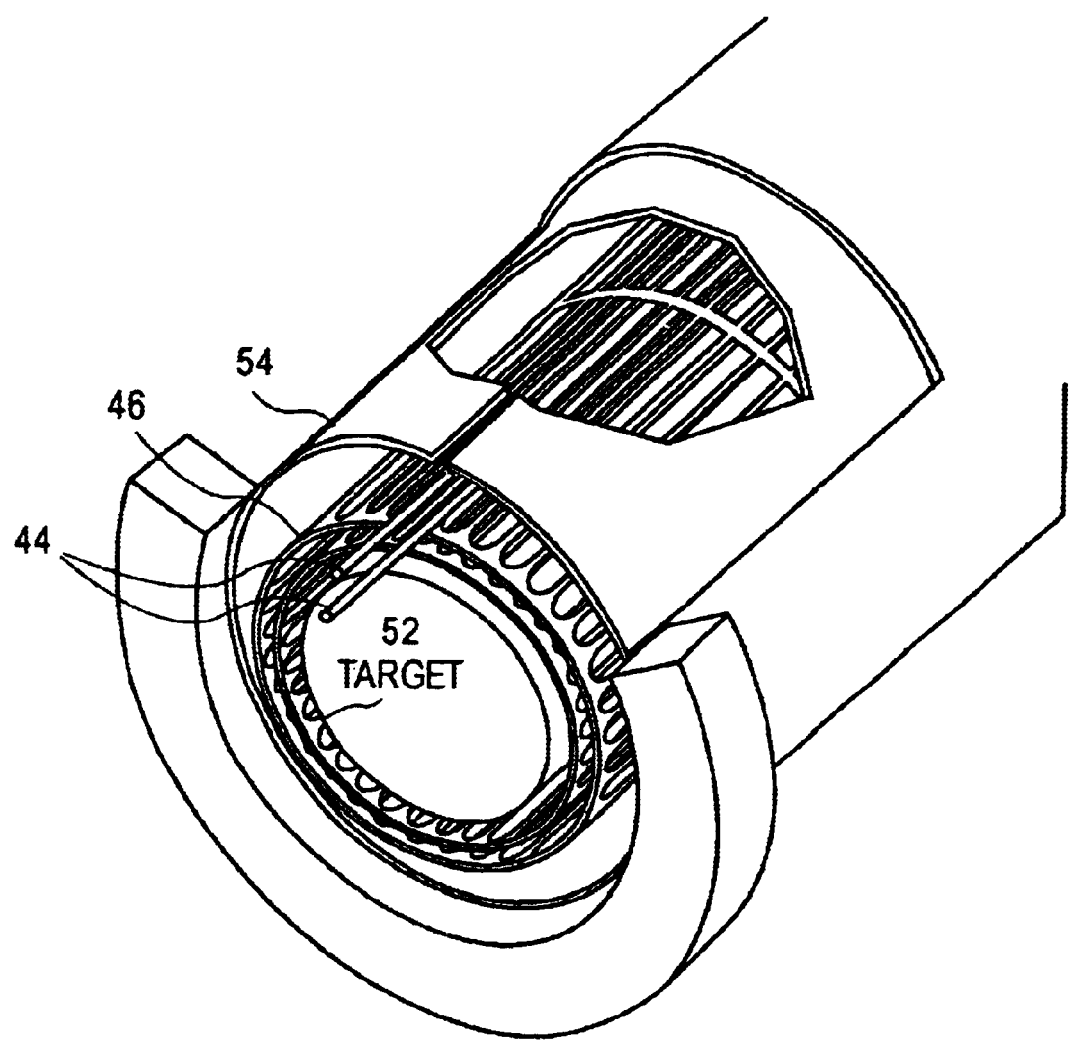

FIG. 4B shows the internal structure of neutron source 40 without chamber 54, and FIG. 5B shows the structure of FIG. 4B inside chamber 54, with flanges 56 extending from the ends of chamber 54. FIG. 5C shows a minor design change in which the RF antenna 44 is incorporated into the plasma electrode 46 and the chamber wall 54. This arrangement makes the source more compact and efficient.

Figure 6A:
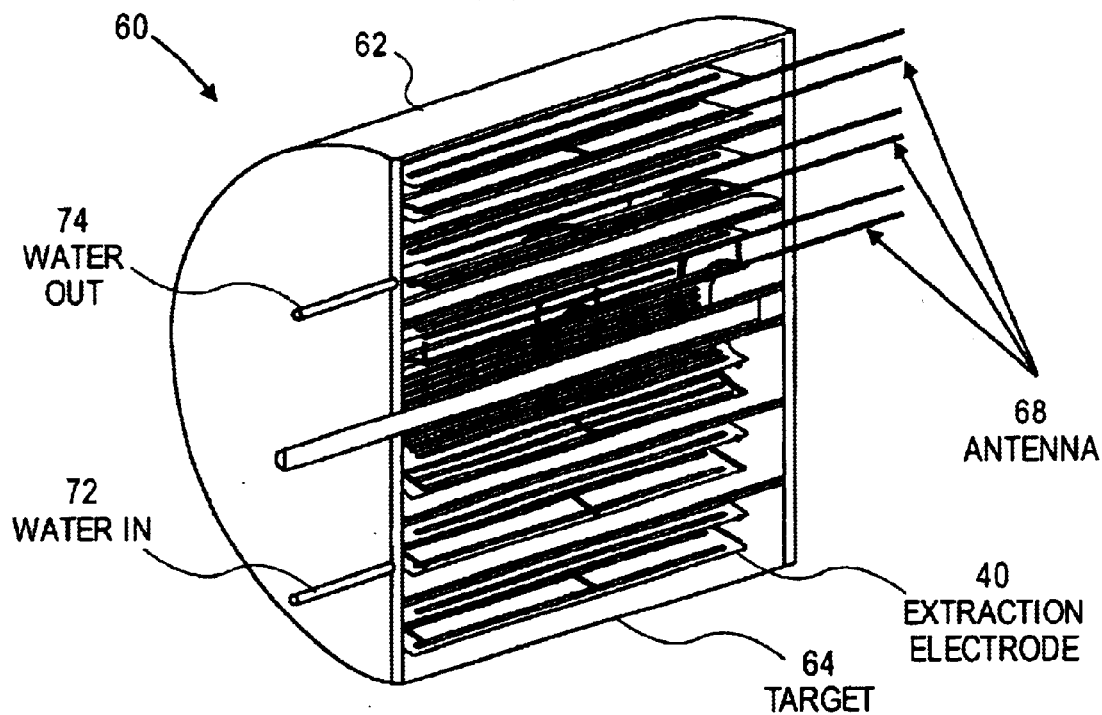
FIGS. 6A, B are a perspective view, partly in section, and a radial cross section of a nested coaxial neutron source.
Figure 6B:
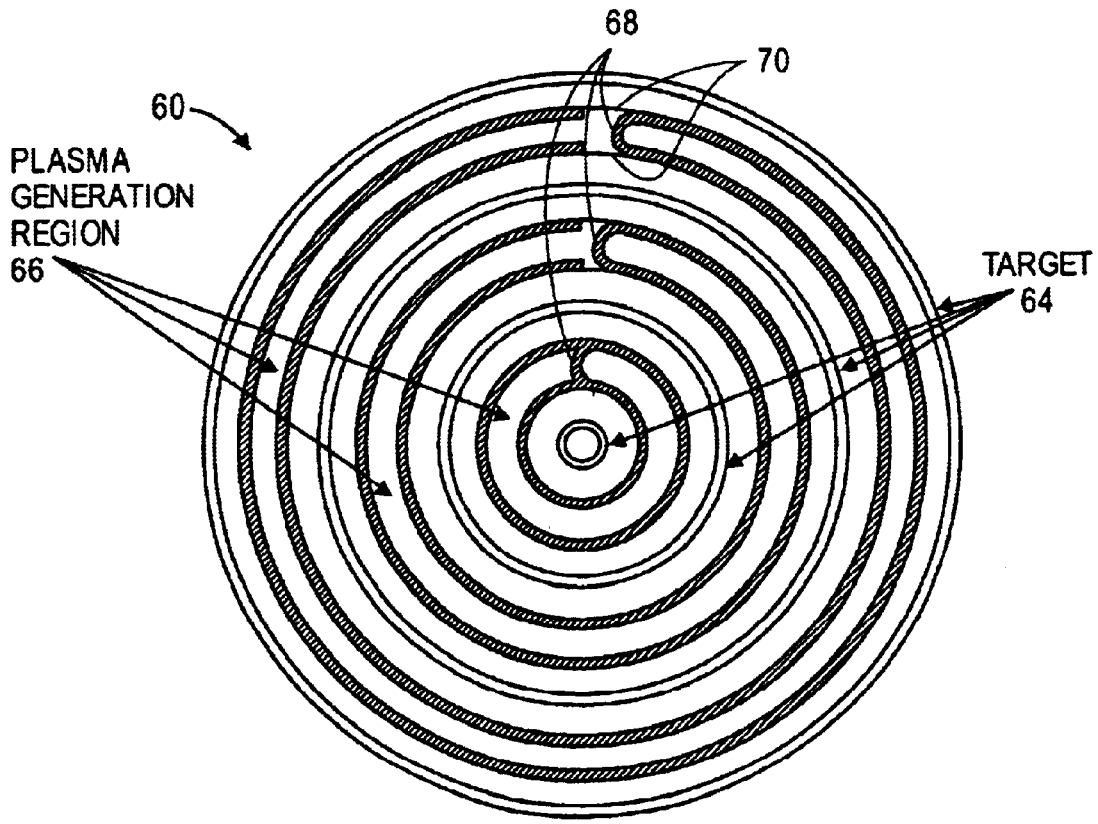
FIGS. 6C, D are radial and axial cross sections of the nested neutron source showing the alternating targets and plasma generating regions with cooling system.
FIGS. 6E, F are radial and axial cross sections of the nested neutron source showing the alternating targets and plasma generating regions with the RF antennas.

FIGS. 6A–B show the neutron source geometry of a third embodiment 60 of a cylindrical neutron generator, which has a nested configuration that is formed by nesting concentric neutron generating targets and plasma generating regions. The nested configuration of source 60 is a combination of sources 10, 40, placing a coaxial target both inside and outside a plasma generating region, and nesting several targets and plasma generating regions to increase the neutron flux. Except for the additional number of each component, each one is structured and functions essentially the same as in the basic embodiments.

Inside a cylindrical chamber 62, a plurality of concentric or coaxial alternating targets 64 and plasma generating regions 66 are arranged. Each target 64 is a cylinder. Each plasma generating region 66 is annular and has an RF antenna (induction coil) 68 positioned therein. While four targets 64 alternating with three plasma generating regions 66 are shown, at least one plasma generating region 66 with two targets 64 are needed and any number of additional nested layers may be added depending on the desired neutron yield. Each plasma generating region 66 is bounded by extraction electrodes 70 on both its inner and outer surfaces. Electrodes 70 contain longitudinal slots, as previously shown, through which ions are extracted from plasma generating regions 66 and directed onto targets 64.

Chamber 60 has a water inlet 72 and water outlet 74 for circulating water or other coolant to remove heat from the targets 64, as described further herein. The targets are typically made of copper with a thin coating of titanium on the surface. The power density generated by the beam is about 600 W/cm$^2$ which can be removed by water cooling.

Figure 6C:
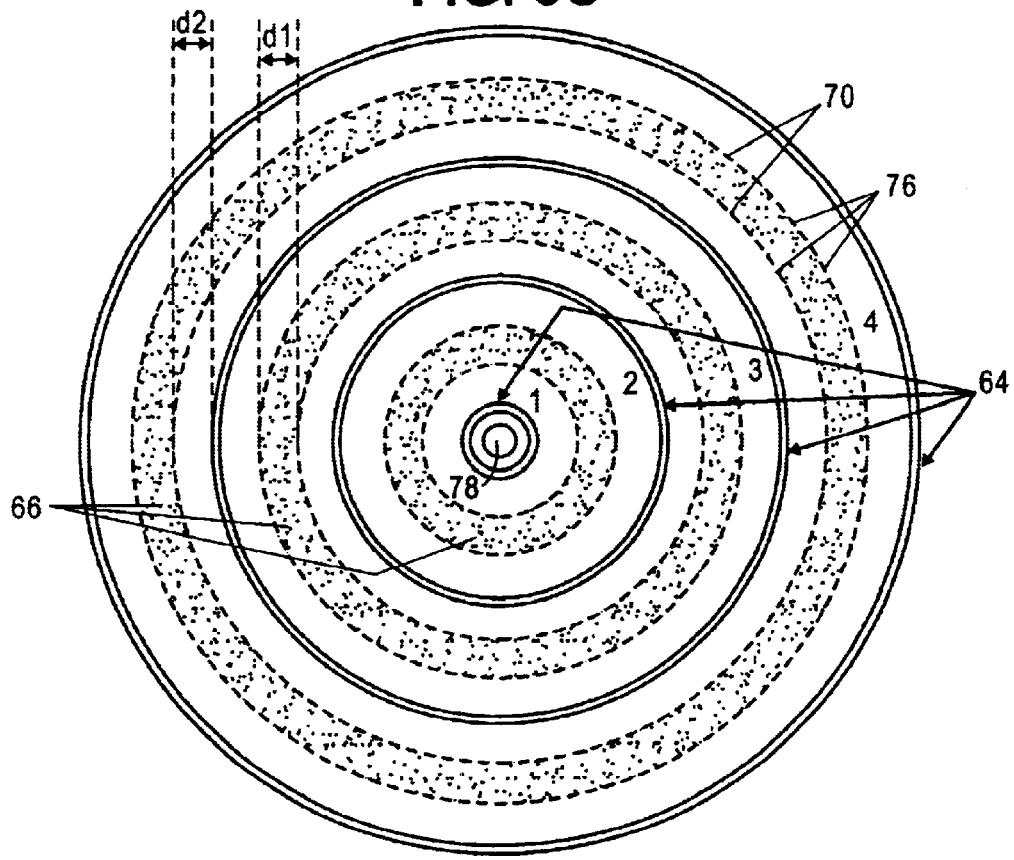
Figure 6D:
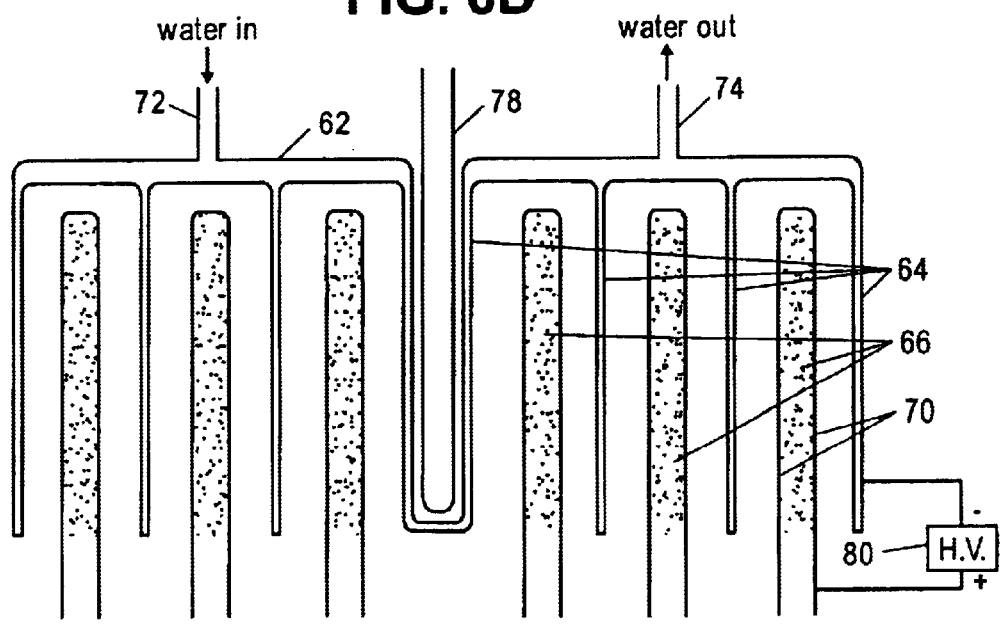

As shown in FIGS. 6C–D, plasma generating regions 66 and targets 64 are nested coaxially. Extraction electrodes 70 with slots 76 bound the regions 66. The width of regions 66 is d1 and the gap from electrode 70 to target 64 is d2; d1 and d2 are typically 2.5 cm. Water inlet 72 and outlet 74 in chamber 62 connect to coolant channels in the chamber wall and targets 64 so that the targets can be cooled by flowing coolant during operation. A target 78 may extend into the center of the source. A high voltage source 80 is connected between the extraction electrodes 70 and targets 64 to extract the ions from regions 66 where they are formed and accelerate them onto the targets 64 where they are collected and react. With a gap of about 2.5 cm, and adequate pumping in the region outside the ion sources, an extraction voltage of 80 kV or higher may be used.

Figure 6E:
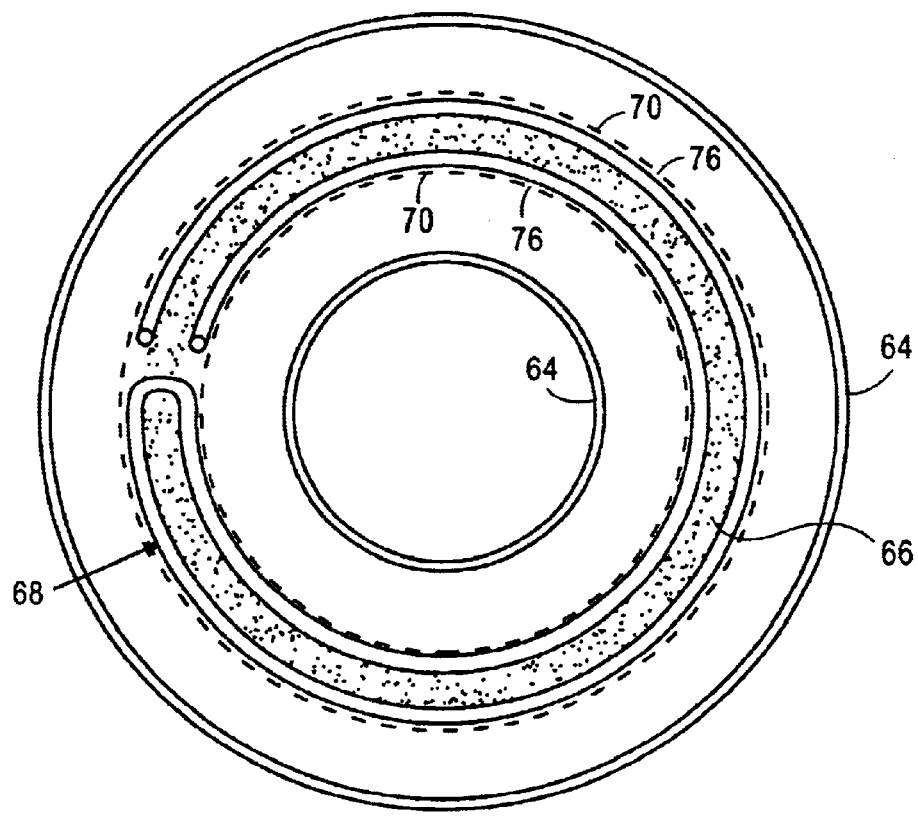
Figure 6F:
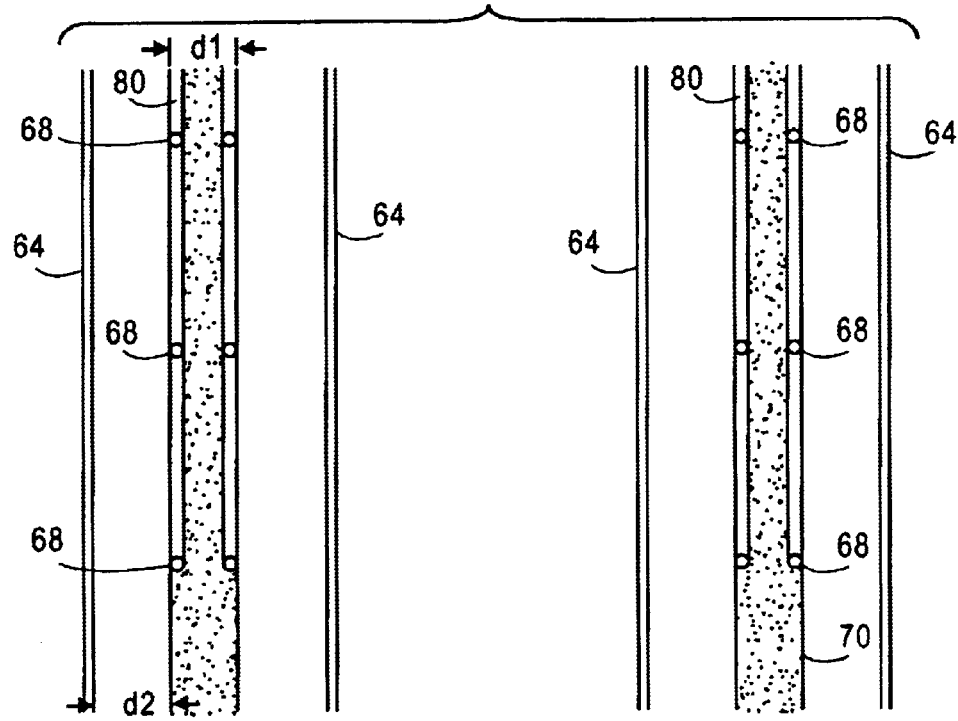

As shown in FIGS. 6E–F, RF antennas 68 are disposed within plasma generating regions 66. As shown in FIG. 6E, a coil of antenna 68 loops around the annular region 66 in a radial plane. As shown in FIG. 6F, a plurality, e.g. three, coils of antenna 68 are spaced apart axially in different radial planes along the length of the source. The separate coils of antenna 68 are all connected together in parallel by linear elements 80 which extend axially along the source. Thus the antenna generally comprises three or more antenna loops with a bi-filar arrangement, normally connected in parallel. The antenna is typically made of titanium tubing, which may be water cooled.

Figure 7:
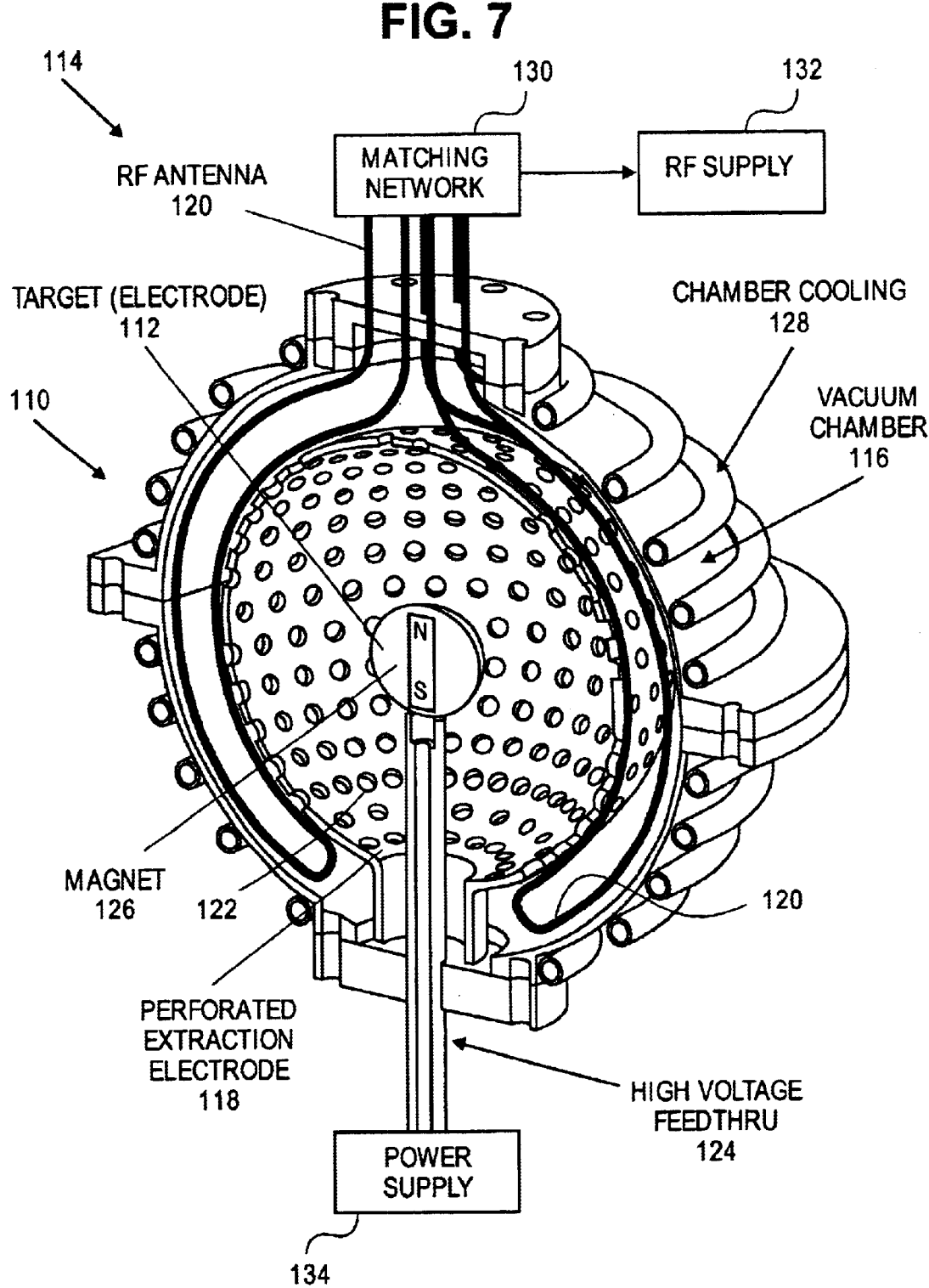
FIG. 7 is a perspective view, partly in section, of a spherical neutron generator.

FIG. 7 shows a spherical neutron generator 110, which has a small spherical neutron generating target (electrode) 112 inside a spherical shell plasma ion source 114. Neutron generator 110 has a spherical target 112 at its center, surrounded by plasma ion source 114. Plasma ion source 114 is formed in the spherical shell defined between outer vacuum chamber 116 and inner perforated extraction electrode 118. For a magnetic cusp ion source, permanent magnets are arranged in a spaced apart relationship, on the outer surface of plasma ion generator 114, to from a magnetic cusp plasma ion source.

Ion source 114 includes at least one RF antenna (induction coil) 120 for producing an ion plasma from tritium gas which is introduced into ion source 114. The antenna(s) 120 are connected through a matching network 130 to an RF power supply 132. Preferably in the spherical shell there will be four RF antennas, one in each quadrant of the shell.

Ion source 114 also includes a spherically shaped extraction electrode 118 at its inner surface. Electrode 118 electrostatically controls the passage of ions from the plasma out of ion source 114. Electrode 118 contains many holes 122 on its circumference so that ions can be extracted from ion source 114 in many beamlets in all directions from the surface.

Inside the surrounding ion source 114 is spherical target 112. Target 112 is the neutron generating element. Ions from plasma source 114 pass through holes 122 in electrode 118 and impinge on target 112, typically with energy of 120 keV to 150 keV, producing neutrons as the result of ion induced reactions. The target 112 is loaded with T atoms by the beam. Titanium is not required, but is preferred for target 112 since it improves the absorption of these atoms. Target 112 may have a titanium surface and may be a titanium sphere or a titanium coated copper sphere.

In operation, target 112 is biased negatively, e.g. −120 kV, with respect to the extraction electrode 118, which is at ground potential. The bias voltage, from power supply 134, is applied to target 112 by high voltage feedthrough 124 which passes through ion source 114. Because of the spherical geometry, the equipotential surfaces between extraction electrode 118 and target 112 will also be spherical in shape and the electric field generated will focus the ions onto the target 112. A magnet 126 inside target 112 is used to suppress the secondary emission electrons generated on the target surface.

Ion source 114 can generate a dense plasma with current density as high as about 1 A/cm². Chamber cooling coils 128 may surround the chamber 116. The resulting neutron flux may reach $10^{16}$ n/s. The neutrons produced will also go out radially from neutron generator 110 in all directions. Because of the small target size, neutron generator 110 acts as a point neutron source.

While the above described cylindrical and spherical neutron generator embodiments are suited for use in the interrogation apparatus of FIG. 2, a preferred neutron generator for explosive and drug detection purposes should produce up to $3.2\times10^{11}$ T-T n/s using a high current and low voltage accelerator (<1.6 A at about 80 to 120 kV). The T-T neutron generator should be compact, e.g. about 6.5 cm diameter by 6.5 cm height). For the desired application, the size of the neutron source, i.e. the target size where the neutrons are produced, is important. The smaller the source size, the better the spectroscopic measurements.

A modified version of the coaxial neutron generator previously described above, with tritium gas for generating neutrons with a continuous energy spectrum ranging from 1 MeV to 9.4 MeV, is particularly adapted for use in the apparatus of FIG. 2. The neutron generator is very compact, with a very small source or target size, yet with a relatively high neutron output flux. The generator is sealed to prevent tritium leakage.

Figure 8A:
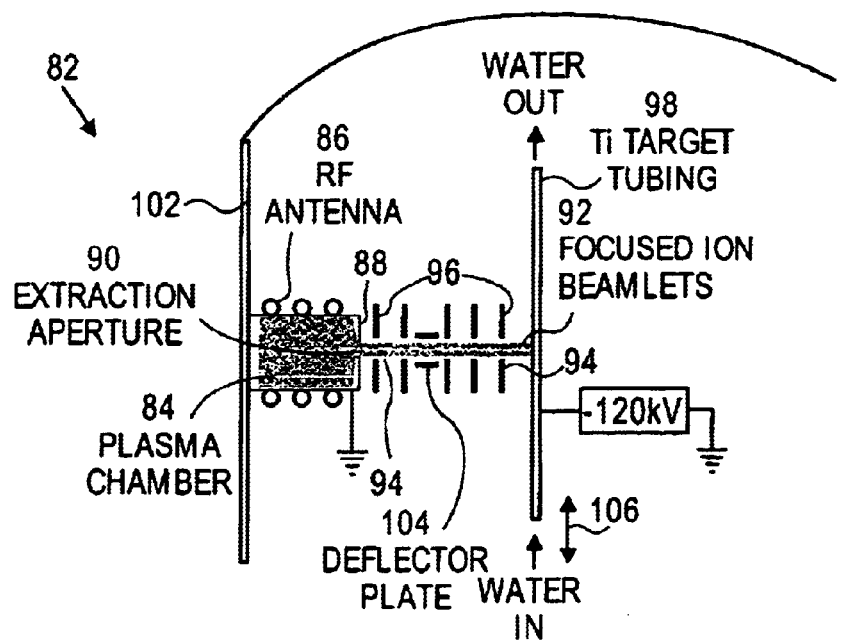
FIGS. 8A, B are side and top cross sectional views of a preferred neutron generator according to the invention.
Figure 8B:
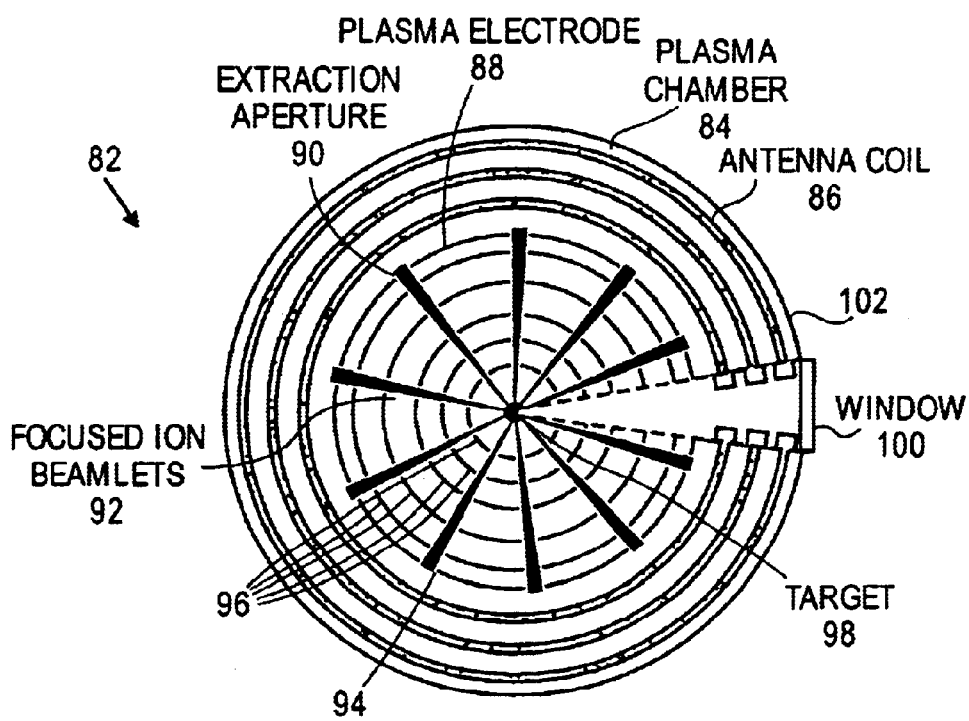

As shown in FIGS. 8A–B, neutron generator 82 has extending inward from its outer circumference, a toroidal or donut shaped plasma chamber 84, typically made of quartz or ceramic, in which a tritium plasma is generated. RF antenna 86, typically a copper or aluminum coil, is wrapped around the plasma chamber 84. Tritium ions are generated from tritium gas by RF induction discharge, e.g. at 13.5 MHz. Since the antenna 86 is located outside the chamber 84, there is no severe limitation on its lifetime.

Plasma electrode 88 with a plurality of spaced extraction apertures 90 forms the inner surface of toroidal plasma chamber 84. A plurality, e.g. 10, of tritium ion beamlets 92, typically of about 2.5 mm diameter, are extracted through apertures 90 in electrode 88, and directed inwardly toward the center of neutron generator 82. Beamlets 92 pass through aligned apertures 94 is a plurality of spaced concentric or coaxial acceleration and focusing electrodes 96 to a target 98 at the center of neutron generator 82. Electrodes 96 focus the beamlets 92 to a smaller spot size, e.g. 1 mm diameter, on target 98. Target 98 is typically biased at −120 kV relative to ion chamber 84/extraction electrode 88, which is typically at ground. Electrodes 96 are at intermediate voltages between ion source 84 and target 98 so the beamlets 92 are accelerated as well as focused.

Target 98 is typically made of titanium tubing with an outer diameter of less than 2 mm. Water is flowed through the tubing for cooling. Ti is preferred as the target material because it can absorb tritium atoms efficiently. The beamlets 92 will irradiate the target 98 substantially uniformly. Target 98 will become loaded with tritium which will react with incident tritium ions. Thus neutrons will be generated substantially isotropically by the T-T fusion reaction. Some of the neutrons will pass through a window 100 in outer wall 102 of neutron generator 82 and be directed onto the article being examined. (While only one window 100 is shown in FIG. 8B, an interrogation system of FIG. 2 would have multiple windows for examining multiple pieces of luggage.)

Because the extracted beamlets 92 are focused to a small spot and the target 98 has a small diameter, the neutron generator is nearly a point source, which is good for neutron spectroscopy. It is also necessary to pulse the beam rapidly to achieve ultrashort neutron bursts. Although the extraction and acceleration voltage can be pulsed, faster switching can be obtained by including orthogonal deflection plates 104 parallel to the beamlet paths so that the beamlets can be electrostatically deflected by applying suitable voltages.

To achieve the desired neutron flux, the total beam power deposited on the target may be too high to cool merely with running water. However target 98 may be moved rapidly up and down, e.g. at about 4 cm/s, as shown by arrows 106 which represent an adjustable speed translation stage, so that the average power deposited on the surface of target 98 may be kept at a reasonable level, e.g. about 500 W/cm², so that the heat load may be effectively removed by a closed water circulation system. Thus the surface temperature of the target can be optimized to achieve the best neutron output.

For other applications, neutron generator 82 of FIGS. 8A–B may be operated with a deuterium or deuterium-tritium plasma instead of a tritium plasma. In that case, the neutron output will have the energy associated with the D-D or D-T reaction instead of the T-T reaction.

Changes and modifications in the specifically described embodiments can be carried out without departing from the scope of the invention which is intended to be limited only by the scope of the appended claims.

What is claimed is:

1. A compact neutron generator, comprising:
    a toroidal shaped plasma chamber disposed from an outer circumference of the neutron generator and extending inward toward a center of the neutron generator;
    a neutron generating target having a share and size disposed at the center of the neutron generator for emitting neutrons both away from the neutron generating target disposed at the center of the neutron generator and toward the outer circumference, the neutron generating target being a structure made of a material capable of absorbing ions provided from the plasma chamber; and,
    a plurality of spaced concentric acceleration and focusing electrodes between the plasma chamber and neutron generating target for accelerating and focusing ions from the plasma chamber onto the neutron generating target.

2. The compact neutron generator of claim 1, further comprising:
    an RF antenna wrapped around the outside of the plasma chamber;
    an RF power supply connected to the RF antenna.

3. The compact neutron generator of claim 1, further comprising:
    a plasma electrode having a plurality of spaced extraction apertures on the surface of the toroidal shaped plasma chamber facing the center of the neutron generator for extracting the ions in a plurality of ion beamlets.

4. The compact neutron generator of claim 3 wherein the extraction apertures have a diameter of about 2.5 mm.

5. The compact neutron generator of claim 1 wherein the plasma chamber is contained within a quartz or ceramic chamber tube.

6. The compact neutron generator of claim 1 wherein the plasma chamber is a source of tritium ions.

7. The compact neutron generator of claim 1 wherein the neutron generating target is a tube made of a material that can absorb tritium.

8. The compact neutron generator of claim 7 wherein the tube is made of titanium.

9. The compact neutron generator of claim 8 wherein the tube has an outer diameter of less than about 2 mm.

10. The compact neutron generator of claim 7 further comprising a coolant flowing through the tube.

11. The compact neutron generator of claim 7 wherein the tube is translated relative to the focused ions incident thereon so that different surface areas of the tube are irradiated by the focused ions as the tube is translated relative to the incident focused ions.

12. The compact neutron generator of claim 11 wherein the tube is translated at a speed of up to about 4 cm/s.

13. The compact neutron generator of claim 1 wherein the target is biased at about −120 kV relative to the plasma chamber.

14. The compact neutron generator of claim 1 wherein the plasma generator is pulsed.

15. The compact neutron generator of claim 1 further comprising at least two deflection plates parallel to the focused ions passing from the plasma chamber to the target.

16. The compact neutron generator of claim 1, further comprising:
    an outer wall disposed about the plasma chamber; and,
    a neutron window disposed in the outer wall.

17. A luggage interrogation system, comprising:
    a compact neutron generator of claim 1 for producing neutrons;
    a neutron collimator having a plurality of channels surrounding the neutron generator;
    a wall surrounding the collimator and having a plurality of apertures aligned with the channels in the collimator;
    a conveyor system for positioning luggage at an aperture in the wall to receive neutrons produced by the generator;
    detectors positioned to detect gamma rays from the luggage produced by neutron bombardment.

18. The luggage interrogation system of claim 17, further comprising:
    a processor connected to the detectors to identify materials in the luggage.

19. The luggage interrogation system of claim 17 wherein the neutron generator is a T-T neutron generator.

* * * * *